United States Patent
Jacobsen (10) Patent No.: US 12,550,908 B2
(45) Date of Patent: Feb. 17, 2026

(54) FISH FEEDING SYSTEM AND METHOD FOR AUTOMATIC FEEDING OF FISH, IN PARTICULAR SALMON SPECIES, WITH DEFINED HEAD-TAIL ORIENTATION AND DEFINED BELLY-BACK ORIENTATION TO A FISH PROCESSING DEVICE

(71) Applicant: NORDISCHER MASCHINENBAU RUD. BAADER GMBH + CO. KG, Lübeck (DE)

(72) Inventor: Ulf Jacobsen, Lübeck (DE)

(73) Assignee: NORDISCHER MASCHINENBAU RUD. BAADER GMBH + CO. KG, Lübeck (DE)

( * ) Notice: Subject to any disclaimer, the term of this patent is extended or adjusted under 35 U.S.C. 154(b) by 0 days.

(21) Appl. No.: 18/718,314

(22) PCT Filed: Dec. 16, 2021

(86) PCT No.: PCT/EP2021/086075
§ 371 (c)(1),
(2) Date: Jun. 10, 2024

(87) PCT Pub. No.: WO2023/110096
PCT Pub. Date: Jun. 22, 2023

(65) Prior Publication Data
US 2025/0057170 A1  Feb. 20, 2025

(51) Int. Cl.
A22C 25/08  (2006.01)
A22B 7/00  (2006.01)
A22C 25/12  (2006.01)

(52) U.S. Cl.
CPC ............. *A22C 25/08* (2013.01); *A22B 7/005* (2013.01); *A22C 25/12* (2013.01)

(58) Field of Classification Search
CPC .......... A22C 25/08; A22C 25/12; A22B 7/005
(Continued)

(56) References Cited

U.S. PATENT DOCUMENTS 1,649,304 A * 11/1927 Gray ................. A22C 25/12
198/397.06
4,601,083 A * 7/1986 Shoji ................. A22C 25/142
452/157

(Continued)

FOREIGN PATENT DOCUMENTS

CN  207428358 U  6/2018
CN  109475133 A  3/2019

(Continued)

OTHER PUBLICATIONS

Denmark Search Report dated Jan. 3, 2025 pertaining to Danish patent application No. PA 2024 30391, pp. 1-4.

(Continued)

*Primary Examiner* — David J Parsley
(74) *Attorney, Agent, or Firm* — Dinsmore & Shohl LLP (57) ABSTRACT

A fish supply system automatedly conveys fish with defined head/tail and prone/supine alignment to a fish processing apparatus. A speed conveyor transverse axially conveys fish with defined alignments to the apparatus. Feeding apparatuses are arranged above the speed conveyor, each having a cascade conveyor for transverse axially conveying fish, having receptacles separated from by controllable flaps. A clocking flap controls output to the speed conveyor from the last receptacle. A supply device includes a first central conveyor belt, flow scales determining fish regulated mass throughput onto the belt. A speed regulatable second central conveyor belt follows the first conveyor belt. Conveyor strands continuously connect the second belt with the feeding, wherein control flaps separate fish from the second conveyor belt to the conveyor strands. A control device (Continued)

connects with and technically controls the first and second conveyor belts, flow scales, the flaps, conveyor strands, speed conveyor and feeding apparatuses.

23 Claims, 7 Drawing Sheets

(58) Field of Classification Search
USPC .......................................... 452/179, 180–184
See application file for complete search history.

(56) References Cited

U.S. PATENT DOCUMENTS

| | | | | |
|---|---|---|---|---|
| 4,613,031 | A * | 9/1986 | Wenzel | A22C 25/12 |
| | | | | 452/179 |
| 5,026,319 | A * | 6/1991 | Miyazaki | A22C 25/145 |
| | | | | 452/179 |
| 5,291,983 | A * | 3/1994 | Pegoraro | B65G 47/256 |
| | | | | 198/399 |
| 5,582,283 | A * | 12/1996 | Arnarson | B65G 47/295 |
| | | | | 198/463.6 |
| 5,702,295 | A * | 12/1997 | Ketels | A22C 25/08 |
| | | | | 452/180 |
| 6,001,011 | A * | 12/1999 | Johnson | A22B 3/083 |
| | | | | 452/65 |
| 7,252,584 | B2 * | 8/2007 | Kragh | A22C 25/08 |
| | | | | 452/163 |
| 7,467,995 | B2 * | 12/2008 | Ketels | A22C 25/142 |
| | | | | 452/162 |
| 10,709,144 | B2 * | 7/2020 | Schubert | B65G 47/46 |
| 2005/0009463 | A1 * | 1/2005 | Grosseholz | A22C 25/00 |
| | | | | 452/179 |
| 2014/0378038 | A1 * | 12/2014 | Baeza Rischter | A22B 3/083 |
| | | | | 452/54 |
| 2017/0231239 | A1 * | 8/2017 | Jacobsen | B07C 5/28 |
| | | | | 452/180 |
| 2018/0160692 | A1 | 6/2018 | Paulsohn | |
| 2019/0116817 | A1 * | 4/2019 | Herbst | A22C 25/08 |

FOREIGN PATENT DOCUMENTS

| | | |
|---|---|---|
| DE | 1481318 A1 | 1/1969 |
| DE | 145054 A1 | 11/1980 |
| WO | 9957016 A1 | 11/1999 |
| WO | 03013262 A1 | 2/2003 |
| WO | 2016020105 A1 | 2/2016 |
| WO | 2016113198 A1 | 7/2016 |
| WO | 2017186274 A1 | 11/2017 |

OTHER PUBLICATIONS

CN First Office Action dated Aug. 8, 2025 pertaining to CN application No. 202180104953.0 filed Dec. 16, 2021, pp. 1-9.

* cited by examiner

FISH FEEDING SYSTEM AND METHOD FOR AUTOMATIC FEEDING OF FISH, IN PARTICULAR SALMON SPECIES, WITH DEFINED HEAD-TAIL ORIENTATION AND DEFINED BELLY-BACK ORIENTATION TO A FISH PROCESSING DEVICE

CROSS-REFERENCE TO RELATED APPLICATIONS

This application is the U.S. National Stage of PCT/EP2021/086075 filed on Dec. 16, 2021, the entire content is incorporated herein by reference in its entirety.

FIELD OF THE INVENTION

The invention relates to a fish supply system, configured and adapted for guiding fish, in particular of the salmon species, with defined head/tail alignment and defined prone/supine alignment automatedly to a fish processing apparatus, comprising a speed conveyor configured and adapted for transverse axially conveying the fish with defined head/tail alignment and defined prone/supine alignment to the fish processing apparatus, as well as at least two feeding apparatuses arranged above the speed conveyor, which each comprise at least one cascade conveyor for transverse axially conveying the fish, which has at least two receptacles separated from each other by controllable flaps, wherein each cascade conveyor has a clocking flap for a controlled output of the fish to the speed conveyor in at least the last receptacle prior to the speed conveyor in conveying direction.

The invention further relates to a method for supplying fish, in particular of the salmon species, with defined head/tail alignment and defined prone/supine alignment to a fish processing apparatus, comprising the steps: aligning the fish in the defined head/tail alignment and the defined prone/supine alignment, positioning the aligned fish in feeding apparatuses upstream of the speed conveyor for transverse axially conveying the fish, the fish being conveyed from a receptacle of a cascade conveyor to the next receptacle of the cascade conveyor in the feeding apparatuses until they lie in conveying direction in the last receptacle at a clocking flap, by means of which the fish are supplied to the speed conveyor in a controlled way, and transverse axial conveying of the fish supplied to the speed conveyor in the direction of the fish processing apparatus.

BACKGROUND OF THE INVENTION

Normally, slaughtered and bled fish are processed at the fish processing apparatus, namely in particular eviscerated and filleted. After slaughtering the fish, namely stunning and killing the fish, the fish are counted and forwarded for bleeding. Counting the fish records and monitors the number of fish processed in the fish processing apparatus, so that the number of fish provided by the fish processing apparatus is available as an input parameter for a control device. Bleeding or draining blood from the slaughtered fish for example takes place in a spiral tank. The mass throughput of the fish is determined prior to the spiral tank, for example with flow scales. The bled fish arrive in large quantities batch-like from the spiral tank and are forwarded into the region of the speed conveyor, where the fish are supplied to the speed conveyor by an operator, wherein the mass throughput of the fish is determined behind the spiral tank if required, for example by means of flow scales. By means of the control device based on the known parameter number of fish following slaughtering and mass throughput prior to and behind the spiral tank a fish supply substantially equal the throughput capacity of the fish processing apparatus can take place into the region of the speed conveyor. The fish accordingly reach the region of the speed conveyor in a capacity-adjusted quantity.

The fish processing apparatus works with a high throughput capacity of up to 250 fish per minute, which is why an adequate and continuous supply of fish must be guaranteed. For this purpose, the fish are supplied with the so-called speed conveyor to the or each fish processing apparatus for this. Currently, the speed conveyor is supplied with fish via the feeding apparatuses arranged above the speed conveyor. In prior art the feeding apparatuses are supplied manually with fish. For this purpose, each feeding apparatus is provided with a work table, onto which the fish are guided following bleeding. An operator picks up each fish at the work table, aligns it in a defined way and then guides it into the feeding apparatus. Fish that do not comply with the quality criteria for automated evisceration are routed to a region for manual evisceration by the operator. The fish slide transverse axially downwards in the direction of the speed conveyor via the individual receptacles of the or each cascade conveyor of the feeding apparatus. The clocking flap of the last receptacle prior to the speed conveyor releases the fish at a pre-selected point in time by means of a control signal. In other words, each cascade conveyor ensures a controlled output of the fish to the speed conveyor. The cascade conveyors or the controllable flaps and the clocking flap communicate with each other and with the speed conveyor for this.

The solution known from prior art, where fish needs to be handled and assessed by operators after bleeding before it is manually supplied to or separated out from the speed conveyor has several disadvantages. The known solution firstly requires an extremely high manual effort. Operators must carry out heavy physical work, as the speed conveyor must be supplied with up to 250 fish per minute. In addition to the mere positioning of the fish in the feeding apparatuses ▯ an operator will position between 20 and 30 fish per minute at most ‖ operators must assess the quality of the fish on the one hand, and may have to separate out and correctly align these on the other hand, namely with a defined head/tail alignment and a defined prone/supine alignment. Secondly there is a lack of feedback between the capacity requirement of the speed conveyor and the capacity on offer following bleeding of the fish, which will not result in a continuous and maximum feeding/filling of the speed conveyor. The interrupted supply flow of fish from the apparatus for bleeding up to the speed conveyor means that important information, which is relevant for capacity adjustment, is lost. Due to the interrupted supply on the one hand, and the interference of operators with the process on the other hand the known solution also lacks the necessary process monitoring and process safety, so that a continuous and adequate supply to the speed conveyor and a gapless filling of the same is not ensured.

SUMMARY OF THE INVENTION

The invention is therefore based on the problem of providing a fish supply system for a fully automated and secure supply process for a gapless filling of the speed conveyor. The problem further consists of suggesting a corresponding method.

This problem is solved by a fish supply system of the kind mentioned above in that a supply device is allocated to the speed conveyor with the feeding apparatuses, which coming from the apparatus for bleeding the fish comprises the following components,: a first central conveyor belt for conveying the fish from the apparatus for bleeding in the direction of the speed conveyor, wherein flow scales for determining the regulated mass throughput of fish flowing from the apparatus for bleeding onto the first conveyor belt are allocated to the first conveyor belt, a second central conveyor belt following on from the first conveyor belt for conveying the fish in the direction of the speed conveyor, wherein the second conveyor belt is configured and adapted to be speed regulatable, at least two conveyor strands, which continuously connect the second conveyor belt with the feeding apparatuses of the speed conveyor for supplying the fish, wherein control flaps for separating out the fish from the second conveyor belt to the at least two conveyor strands are allocated to the second conveyor belt, and a control device connected at least with the first conveyor belt and the flow scales, the second conveyor belt and the control flaps, the conveyor strands as well as the speed conveyor and the feeding apparatuses in a control technical way for supplying the speed conveyor with fish.

The fish supply system according to the invention makes it possible to link the apparatus for bleeding the fish with the or any fish processing apparatus namely in particular an apparatus or several apparatuses for eviscerating the fish, which allow an operator-free supply of fish, for the first time. Two or more of such fish processing apparatuses, which are supplied with fish by means of the one speed conveyor, are preferably arranged along the speed conveyor. The fish supply system which is continuous from the apparatus for bleeding to the speed conveyor removes a considerable load from the operator and reduces error sources when filling the speed conveyor and allows continuous process monitoring, so that process safety is increased. The connection between the second conveyor belt and the speed conveyor with at least two conveyor strands allows an adjusted supply depending on the capacity required. The continuous and automated supply of fish ensures a gapless and capacity-optimised supply of fish to the speed conveyor with a maximum filling of the same. The fact that the control device is connected with the input side components of the fish supply system, namely with the first conveyor belt and the flow scales as well as the second conveyor belt and the control flaps, and with the output side components of the fish supply system, namely with the speed conveyor and the feeding apparatuses, can create a relationship or a connection, respectively, between the signal input parameters, namely in particular the number of fish and the actual mass throughput supplied, and the signal output parameters, namely in particular the total output of the speed conveyor, which guarantees a gapless and capacity-optimised filling of the speed conveyor.

The first central conveyor belt is configured and adapted for receiving the fish from an apparatus for bleeding. The first central conveyor belt and the second central conveyor belt can also be configured as a common and continuous conveyor belt or a divided conveyor belt. A factory layout where the or each speed conveyor is connected via a continuous and gapless fish supply system with the apparatus for bleeding and is also configured and adapted for recording and processing signal parameters from process steps determined by the apparatus for bleeding, such as for example the number of fish supplied, is crucial for the invention. The control device of the fish supply system is configured and adapted accordingly.

A particularly preferred further development is characterised in that each conveyor strand comprises at least one ascending conveyor following on from the second conveyor belt, for separating and transverse axially conveying the fish, a slide following on from the ascending conveyor, for untangling the fish, a first belt conveyor following on from the slide, for longitudinal axially conveying the fish, at least one handling apparatus arranged above the first belt conveyor, configured and adapted for receiving the fish from the first belt conveyor and releasing the fish, head first, to at least one second belt conveyor, the or each second belt conveyor following on from the or each first belt conveyor for longitudinal axially conveying the fish, head first, to which a deflector for deflecting the fish from the second belt conveyor to a cascade conveyor is allocated, the cascade conveyor following on from the second belt conveyor for transverse axially conveying of the fish, which has at least two receptacles separated from each other by controllable flaps, wherein the cascade conveyor has a clocking flap at least in the last receptacle in conveying direction, a third belt conveyor following on from the cascade conveyor, for longitudinal axially conveying the fish, head first, a turning station, allocated to the third belt conveyor, for carrying out a correction of the prone/supine alignment, and a handling apparatus arranged above the third belt conveyor, for transverse axially conveying the fish from the third belt conveyor to one of the feeding apparatuses. Other, identically acting active or passive conveyor means can also be used in place of the belt conveyor and slides. A particularly process-secure supply of the fish from the apparatus for bleeding onto the speed conveyor is guaranteed with this design, so that the fish processing apparatus following on from the speed conveyor can be maximally and continuously supplied with fish.

The control device advantageously comprises a program component, which is configured and adapted to adjust the capacity of the conveyor strands to the capacity of the speed conveyor. The control device ensures with its programming that all components of the fish supply device that generate signal parameters and/or are driven stand in communication connection with each other, whereby the individual components are controllable harmonized with each other in such a way that a connection between the total utilisation of the speed conveyor on the one hand, and the mass throughput of the conveyor strands on the other hand can be produced. In other words, all incoming signal parameters, i. e. amongst others the determined or available number of fish and/or the determined mass throughput of fish processed, amongst others, are processed for controlling the individual components. This leads to a gapless and capacity-optimised filling of the speed conveyor.

The speed conveyor is advantageously a circumferentially driven endless conveyor and comprises troughs for individually receiving fish, wherein each trough is configured and adapted for forwarding the fish to a longitudinal conveyor lying below the troughs, wherein the longitudinal conveyor is configured and adapted for longitudinal axially conveying the fish, tail first. The speed conveyor itself comprises a plurality of troughs or receiving elements, respectively, each configured for individually receiving one fish. The troughs/receiving elements themselves can be inclined in order to enable a sliding of the fish from the troughs/receiving elements onto the longitudinal conveyor. The troughs/receiving elements can however have flaps or suchlike in the region of a floor in order to be able to supply the fish to the longitudinal conveyors lying below.

A scale for determining the actual mass of the fish to be conveyed is expediently arranged prior to the ascending conveyor between the second conveyor belt and the ascending conveyor of each conveyor strand. The scales can be allocated to a sump-like slide or suchlike or can themselves for example be configured as flow scales. The scales or a conveyor element comprising the scales convey the fish from the second conveyor belt to a takeover region of the ascending conveyor. The weight of the supplied/incoming fish is determined as an actual quantity separately for each conveyor strand with the scales. An even more precise and capacity-optimised distribution and supply of the fish to the speed conveyor is made possible in this way.

A preferred further development is characterised in that each ascending conveyor is configured as a circumferentially driven trough conveyor and that a detection means for detecting the occupation of the troughs of the ascending conveyor is allocated to the ascending conveyor of each conveyor strand. The ascending conveyor can be a simple circumferentially driven conveyor belt with separating bridges for forming individual troughs/receptacles. The ascending conveyor can also be formed by a plurality of individual receptacles connected with each other as a kind of trough conveyor chain. A camera is for example arranged above the ascending conveyor as a detection means, for example for detecting a double occupancy or emptiness of troughs/receptacles. Other detection means as well as their number and positioning can however also be used. The individual monitoring of each ascending conveyor and its troughs/receptacles can realise a process-monitored and optimised supply of fish in the direction of the speed conveyor. The detection means supply additional signal parameters, which can be recorded and processed by the control device in order to adapt the capacity control yet more finely and precisely.

One preferred embodiment is characterised in that each ascending conveyor comprises an upwardly running upper run for the individual conveying of the fish lying in the troughs and a downwardly running lower run for returning empty troughs, configured and adapted at the upper end of the ascending conveyor in the deflection region of the upper run to the lower run for supplying the fish. The fish are removed or taken up from the second conveyor belt or the scales in the lower takeover region and conveyed diagonally upwards to an upper output region by means of the upper run.

Advantageously, a housing is allocated to each ascending conveyor is in the deflection area from upper run to lower run, which is configured and adapted for guiding and holding the fish in the troughs, wherein the housing has at least one controlled flap for overhead release of the fish from the ascending conveyor on the side facing the lower run above the conveyor downstream of the ascending conveyor. The housing describes any kind of open or closed guide, which ensures that the fish are held in the troughs during transfer from the upper run to the lower run in order to guarantee an overhead output above the conveyor means downstream of the ascending conveyor. The overhead output of fish by means of the controlled flap or suchlike ensures a controlled and targeted output or forwarding of the fish to the downstream conveyor means. Said output further facilitates and supports the separation and untangling of the fish. The downstream conveyor means can be a slide for untangling the fish. The downstream conveyor means can however also be a conveyor belt in combination with a slide, which conveys the fish to the slide. The slide can optionally also transform into a conveyor belt with guide plates arranged in a fan shape or suchlike in order to support the untangling and separating of the fish further. Untangling describes a preferably multi-track output across the width of the downstream conveyor means. The conditions for an improved process monitoring are given in this way, as the fish can be conveyed onwards individually and at a distance from each other.

At least one detection means for detecting the position of the fish on the belt conveyor and for detecting the orientation of the fish on the belt conveyor is advantageously allocated to the first belt conveyor of each conveyor strand. A camera is preferably arranged above the first belt conveyor, which takes pictures, detects the position of the fish on the conveyor belt by means of the control device and in particular detects the fish with regard to their head/tail alignment and their prone/supine alignment. Other detection means can also be used. It is also possible to use several detection means arranged transverse and longitudinally to the conveying direction of the first conveyor belt. Knowing the position of the fish on the conveyor belt and their alignment further simplifies or improves, respectively, the further automated handling on the one hand, and process safety on the other hand.

A particularly advantageous further development is characterised in that the handling apparatus for producing an operative connection with the fish can be placed on the same from above as well as configured and adapted for aligning, pulling and sliding the fish from the first belt conveyor to the or each second belt conveyor. The handling apparatus can of course also be configured in some other way as long as it is configured and adapted for taking the fish from the first belt conveyor and for supplying or handing over the fish with a defined head/tail alignment to the second belt conveyor, preferably head first. The handling apparatus comprises a gripper means. The gripper means is arranged on a linear guide and is linearly moveable, namely transverse to the conveying direction of the first belt conveyor and vertically to the first belt conveyor. Further, the gripper means is also rotatably configured on the linear guide, wherein the described movements and degrees of freedom can also be configured to be overlaid. The gripper means can apply a force to the fish from above which can then be pulled to slip and slide off the first belt conveyor and aligned head first. The fish are gripped on the basis of the signal parameters and information regarding the position of said fish on the first conveyor belt and the alignment of the fish by means of the handling apparatus, preferably in the region of the mass centre of gravity. Gripping also comprises a force influence applied to the fish vertically from above. The fish held in this way is then pulled to slip/slide off the first conveyor belt and is swivelled or turned around an axis of rotation aligned vertical to the conveyor belt in such a way that a head first supply to the second belt conveyor is ensured. The handling apparatus can, also be a multi-dimensionally moveable robot arm, which for example comprises suction pads, for suctioning, lifting, aligning and moving the fish into the defined output position to the second belt conveyor. Other constructions for aligning the fish and transferring the same from the first belt conveyor to the second belt conveyor can also be used.

The first belt conveyor and every second belt conveyor are expediently connected with each other by a slide. The fish can be taken from the first belt conveyor, aligned and placed directly on the second belt conveyor. A vertical force can, however, also be applied to the fish from above and the fish can be pulled from the first belt conveyor via the slide to the or each second belt conveyor. The slide simplifies the transition between two belt conveyors here.

A preferred embodiment is characterised in that at least one detection means is allocated to the third belt conveyor in conveying direction behind the turning station and prior to the feeding apparatus, which detection means is configured and adapted for assessing different quality criteria. At least one camera is arranged above the third belt conveyor for this. Preferably, several cameras are arranged in different positions in order to record the fish flowing through from several viewing angles and to assess it according to different quality criteria. Further signal parameters are thus detected, which can be recorded by the control device and can be used for an optimised process control. Fish that does not comply with the quality criteria for further processing, and in particular for automated evisceration, can be automatically separated out, for example to a work table for manual evisceration. Fish suitable for further processing is then supplied to the respective feeding apparatuses by the handling apparatus. The handling apparatus is configured and adapted for pulling the fish from the third belt conveyor and supply it to the feeding apparatuses, which firstly serve as a store and secondly ensure a controlled output of fish to free troughs of the speed conveyor via the clocking flaps. The handling apparatus can be a simple rake, by means of which fish can be pulled from the third belt conveyor. Fish that is not suitable for further processing will pass the handling apparatus and can be issued afterwards. Other constructions, for example robot arms or suchlike, can also be used.

In an expedient further development a fourth belt conveyor is arranged flush in conveying direction behind the third belt conveyor, wherein the detection device is arranged in the transition from the third belt conveyor to the fourth belt conveyor and the handling device is allocated to the fourth belt conveyor for transverse axially conveying the fish to the feeding apparatus.

The first conveyor belt is preferably aligned at a substantially right angle to the second conveyor belt. This can firstly lead to a space saving layout. The transfer from the conveyor belt on which the mass throughput is detected to the conveyor belt that is configured for speed regulation is secondly also simplified.

The problem is further also solved by a method of the kind mentioned above in that the fish is conveyed by means of a supply device from a device for bleeding the fish to the feeding apparatuses of the speed conveyor, wherein the fish are continuously automatically conveyed, starting from the device for bleeding to the speed conveyor, and the regulated mass throughput of fish is determined, and the fish are conveyed in a speed regulated way and distributed onto several conveyor strands in a controlled way, wherein the supply device is controlled at the speed conveyor depending on the capacity required. The speed conveyor is in fact also controlled with the feeding apparatuses. The capacity of the speed conveyor is however determined by the capacity requirement of the downstream fish processing apparatus or the downstream fish processing apparatuses, which also equal the capacity requirement of the speed conveyor. In other words, a necessary supply capacity (specific number of fish per minute) of the speed conveyor is stipulated, which the supply device must supply to the feeding apparatuses. The invention allows precisely this capacity-adjusted and optimised automatic supply of fish. The automatic control of the supply device adjusts the capacity of the conveyor strands to the capacity of the speed conveyor.

A preferred further development is characterised in that the fish are conveyed from the apparatus for bleeding the fish to each ascending conveyor by means of a first conveyor belt and a second conveyor belt, wherein the mass throughput of the fish is determined along the first conveyor belt and the second conveyor belt is regulated with regard to its conveyor speed.

Along each conveyor strand, the fish are preferably automatically separated, then tangled out, then aligned, head first, with regard to their head/tail alignment, then with regard to their prone/supine alignment and subsequently supplied to the feeding apparatuses. All of these handling steps are carried out automatically, firstly to relieve the operator, and secondly to increase the precision and reproducibility of the gapless filling. As the fish flow in batches and unsorted in the direction of the supply unit behind the apparatus for bleeding, separation takes place on every conveyor strand. Untangling is lastly a distributing of the separated fish onto several paths, so that the fish lie at a distance from each other in a longitudinal direction and in transverse direction.

The fish are advantageously first conveyed transverse axially, then longitudinal axially along each conveyor strand, then around an axis of rotation that is aligned vertical to the longitudinal alignment of the fish and vertical to the plane of transportation, turned, then first longitudinal axially again, then transverse axially, and then once more longitudinal axially conveyed, before they are conveyed transverse axially into the feeding apparatuses. The [] repositioning[] of the fish or the conveying of the fish in different alignments of the fish allows an optimal alignment with regard to the respective functionality carried out with or on the respective conveying medium for each individual process step.

A preferred further development is characterised in that a first detection for detecting the occupation of a conveyor strand during transverse conveying the fish in an ascending conveyor takes place along each conveyor strand. The detection means supplies information with regard to the over- or underoccupancy of the ascending conveyor, so that the supply of fish to the ascending conveyor can be adjusted if necessary. The information can further be used for an adjusted distribution of the fish to the conveyor strands and the continuous and maximum supply of the speed conveyor with fish.

A second detection for detecting the position of the fish and the head/tail alignment on each conveyor strand preferably takes place along each conveyor strand during the longitudinal conveying of the fish on a belt conveyor. This information is helpful for the final and precise alignment of the fish and can also be used for an adjusted distribution of the fish onto part strands of a conveyor strand and the continuous and maximum supply of the speed conveyor with fish.

A preferred embodiment is characterised in that a third detection for assessing different quality criteria during the longitudinal conveying of fish on a belt conveyor takes place along each conveyor strand. This detection allows the automatic distribution of the fish that comply with the criteria for automatic further processing, in particular automated evisceration, to the feeding apparatuses, whilst fish that do not fulfil these criteria are automatically separated out and e.g. supplied to a work table for manual post-processing.

The actual mass of fish along each conveyor strand is advantageously determined before the fish are taken over by the ascending conveyor. The supply of fish can be regulated from the sum of information, namely the number of fish following killing, the mass throughput of fish following bleeding as well as the actual condition of the mass on each conveyor strand by means of the conveying speed of the conveyor means and the distribution of the fish controlled or regulated to several conveyor strands in order to ensure a maximum and gapless filling of the speed conveyor.

A force is expediently applied to the fish from above for aligning the final head/tail alignment on the first belt conveyor, and the fish are then pulled from the first belt conveyor onto the second belt conveyor, the fish being aligned head first. Thus, a simple and precise possibility of moving the fish from a first belt conveyor onto a second belt conveyor and overlay the final head/tail alignment is created.

The fish are advantageously also finally aligned with regard to the prone/supine alignment after this head/tail alignment.

The method is particularly preferably carried out with a fish supply system as disclosed herein.

The advantages resulting from this have already been described in connection with the supply system, which is why we refer to the respective passages, which accordingly also apply for the method, in order to avoid repetition.

BRIEF DESCRIPTION OF THE DRAWINGS

Further expedient and/or advantageous features and further developments of the fish supply system as well as the method for automatedly supplying fish to a fish processing apparatus or to several fish processing apparatuses result from the description. Particularly preferred embodiments of the fish supply system as well as the method are explained in more detail with reference to the enclosed drawing. In the drawing.

DETAILED DESCRIPTION OF THE INVENTION

The fish supply system illustrated in the drawing serves for supplying slaughtered and bled salmon to a speed conveyor, by means of which several fish processing apparatuses are supplied with salmon. The fish supply system can also be used for linking other processing machines and apparatuses, also for other types of fish.

Figure 1:
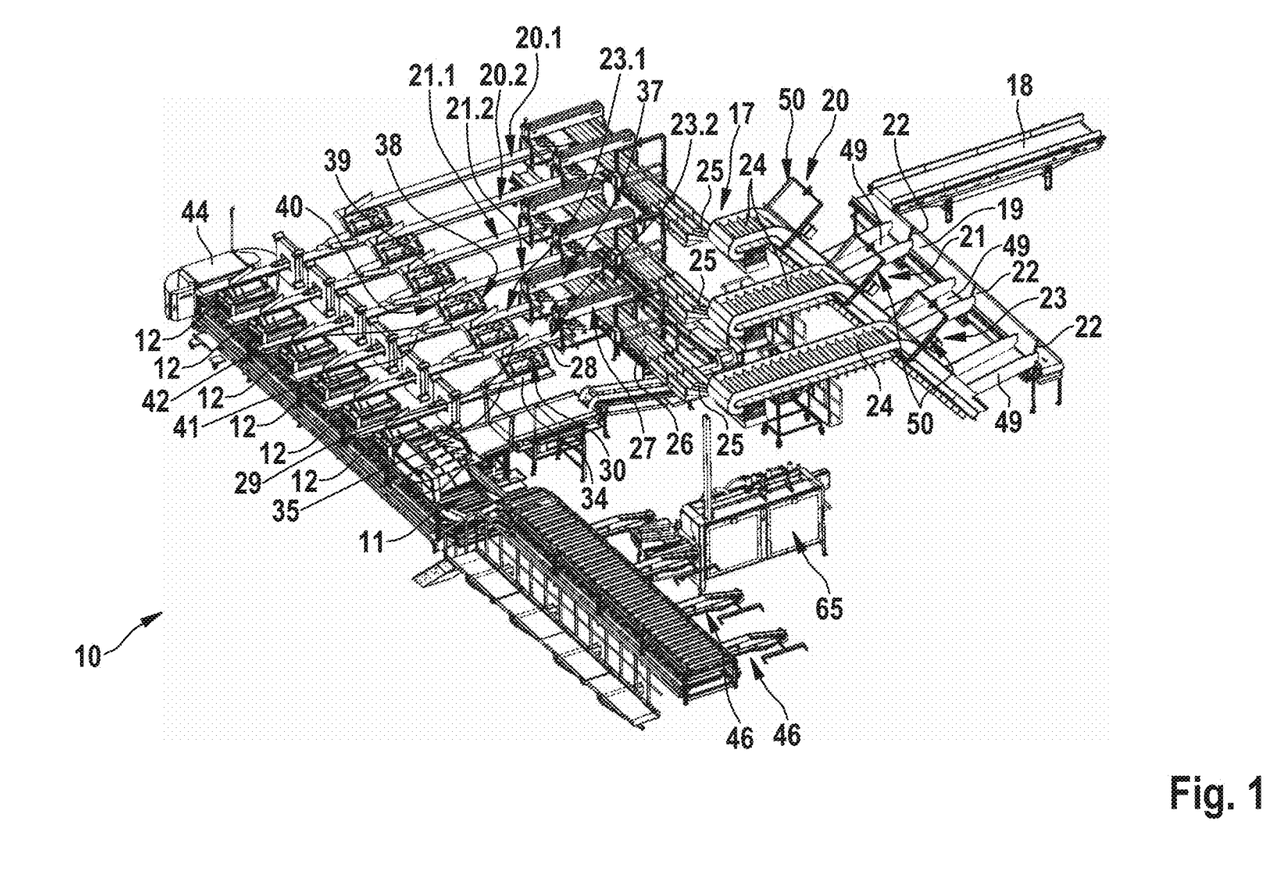
FIG. 1 shows a schematic illustration of the overall layout of the fish supply system according to the invention in a perspective view.

The invention deals with a fish supply system 10, configured and adapted for automatedly supplying fish 100, in particular of the salmon species, with defined head/tail alignment and defined prone/supine alignment automatically to a fish processing apparatus 65, comprising a speed conveyor 11, which is configured and adapted for transverse axially conveying the fish 100 with defined head/tail alignment and defined prone/supine alignment to the fish processing apparatus 65, as well as at least two feeding apparatuses 12 arranged above the speed conveyor 11, which each comprise at least one cascade conveyor 13 for transverse axially conveying the fish 100, having at least two receptacles 15 separated from each other by two controllable flaps 14, wherein each cascade conveyor 13 has at least one clocking flap 16 for the controlled output of fish 100 to the speed conveyor 11 at least in the last receptacle 15 prior to the speed conveyor 11 in conveying direction.

This fish supply system 10 is characterised according to the invention in that a supply device 17 is allocated to the speed conveyor 11 with the feeding apparatuses 12, which supply device comprises the following components, coming from the apparatus for bleeding the fish: a first central conveyor belt 18 for conveying the fish 100 from the apparatus for bleeding in the direction of the speed conveyor 11, wherein flow scales for determining the regulated mass throughput of fish 100 flowing from the apparatus for bleeding onto the first conveyor belt 18 is allocated to the first conveyor belt 18, a second central conveyor belt 19 following on from the first conveyor belt 18 for conveying the fish 100 in the direction of the speed conveyor 11, wherein the second conveyor belt 19 is configured and adapted to be speed regulatable, at least two conveyor strands 20, 21, 23, which continuously connect the second conveyor belt 19 with the feeding apparatuses 12 of the speed conveyor 11 for supplying the fish 100, wherein control flaps 22 for separating out the fish 100 from the second conveyor belt 19 to the at least two conveyor strands 20, 21 are allocated to the second conveyor belt 19, and a control device 44 connected at least with the first conveyor belt 18 and the flow scales, the second conveyor belt 19 and the control flaps 22, the conveyor strands 20, 21 as well as the speed conveyor 11 and the feeding apparatuses 12 in a control technical way for supplying the speed conveyor 11 with fish 100.

The features and further developments described in the following constitute preferred embodiments on their own or in combination with each other. It is specifically pointed out that features summarised in the description and/or the drawing or described in a common embodiment can also develop the fish supply system 10 described above further in a functionally independent way.

The first conveyor belt 18 is aligned at a substantially right angle to the second conveyor belt 19. The two conveyor belts 18, 19 can also be arranged at any other angle to each other, in particular also flush. The speed conveyor 11 is a transverse conveyor, which for conveying the fish 100 is configured transverse to their head/tail alignment. The orientation of the fish 100 with regard to their head/tail alignment can be any in principle, wherein the fish 100 are preferably orientated in such a way that conveyed behind the speed conveyor 11 they are with their tail first. The embodiment shown has a third conveyor strand 23 in addition to the two conveyor strands 20, 21. The three, or also more conveyor strands 20, 21, 23 are all constructed comparably, which is why only one of the conveyor strands 20, 21, 23 is described in more detail in the following by way of example. The other conveyor strands 23, 21, 20 are configured comparably. A feeding apparatus 12E is allocated to ach conveyor strand 20, 21, 23. Each feeding apparatus 12 comprises at least one cascade conveyor 13 with several receptacles 15 separated from each other by controllable flaps 14. With two receptacles 15 at least one of the flaps 14 is a controllable storage flap element. The last flap 14 before the speed conveyor 11 in conveying direction is the controllably moveable clocking flap 16.

For a continuous and gapless connection of the second conveyor belt 19 with the feeding apparatuses 12, each conveyor strand 20, 21, 23 comprises at least one ascending conveyor 24 following on from the second conveyor belt 19 for separating and transverse axially conveying the fish 100, a slide 25 following on from the ascending conveyor 24 for untangling the fish 100, a first belt conveyor 26 following on from the slide 25 for the longitudinal conveying of the fish 100, at least one handling apparatus 27 arranged above the first belt conveyor 26 which is configured and adapted for taking the fish 100 off the first belt conveyor 26 and releasing the fish 100 head first to at least one second belt conveyor 28, and the or any second belt conveyor 28 following on from the first belt conveyor 26 for longitudinal axially conveying the fish 100 head first, to which a deflector 29 for deflecting the fish 100 from the second belt conveyor 28 to a cascade conveyor 30 is allocated, the cascade conveyor 30 following on from the second belt conveyor 28 for transverse axially conveying the fish 100, which has at least two receptacles 32 separated from each other by controllable flaps 31, wherein the cascade conveyor 30 has at least one clocking flap 33 in in the last receptacle 32 in conveying direction, a third belt conveyor 34 following on from the cascade conveyor 30 for longitudinal axially conveying the fish 100 head first, a turning station 35 allocated to the third belt conveyor 34 for carrying out a correction of the prone/supine alignment, and a handling apparatus 36 arranged above the third belt conveyor 34 for transverse axially conveying the fish 100 from the third belt conveyor 34 to one of the feeding apparatuses 12. The ascending conveyor 24, the first belt conveyor 26, the or each handling apparatus 27, the second belt conveyor 28, the cascade conveyor 30 with the clocking flap 33, the third belt conveyor 34 and the or each handling apparatus 36 are preferably connected with the control device 44 in order to be able to centrally collect and/or process and/or control the data and/or information of the components.

Figure 5:
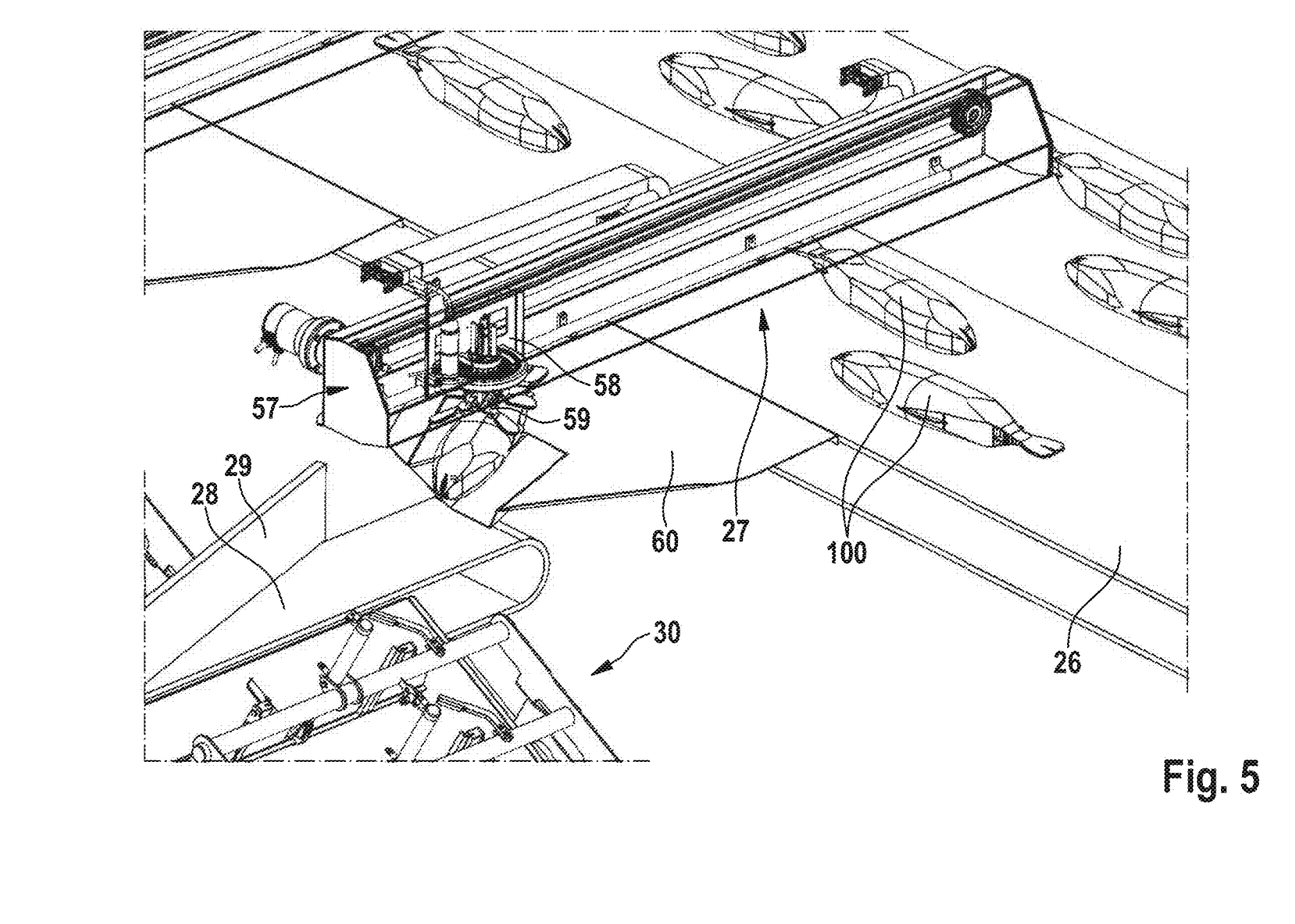
FIG. 5 shows a detailed view of the first belt conveyor with a handling apparatus.

Two handling apparatuses 27, 37 are allocated to the first belt conveyor 26 one behind the other in conveying direction in the illustrated embodiment in such a way that parts of the product stream formed by the fish 100 and lying on the first belt conveyor 26 are taken off by the first handling apparatus 27 and other parts of the product stream are taken off by the second handling apparatus 37. The product stream or each conveyor strand 20, 21, 23, respectively, are thus divided into two partial strands 20.1, 20.2; 21.1, 21.2; 23.1, 23.2, so that each partial strand 20.1, 20.2; 21.1, 21.2; 23.1, 23.2 supplies one feeding apparatus 12. The individual components of each partial strand 20.1, 20.2; 21.1, 21.2; 23.1, 23.2 are preferably identical in construction. A second belt conveyor 28, 38 is provided behind each handling apparatus 27, 37 for this purpose, which belt conveyor 28, 38 supplies a separate cascade conveyor 30, 40 via a deflector 29, 39. The or each deflector 29, 39 can be a simple, locationally fixed deflector plate. The or each deflector 29, 39 can however optionally also be a controlled deflector flap. The or each cascade conveyor 30, 40 following the second belt conveyor 28, 38 is preferably configured according to the cascade conveyor 13 of the feeding apparatus 12. Each cascade conveyor 30, 40 is followed by a third belt conveyor 34, 41 with its own turning station 35, 42 as well as with its own handling apparatus 36, 43, which are configured for releasing the fish 100 to separate feeding apparatuses 12.

The control device 44, with which all components of the fish supply system 10 are preferably connected, comprises a program component that is configured and adapted for adjusting the capacity of the conveyor strands 20, 21, 23 to the capacity of the speed conveyor 11. All information supplied to the control devices 44, in particular in the form of control signals, which amongst other things include information about the number of fish supplied, the mass throughput as well as the capacities of the speed conveyor 11 on the one hand, and all conveyor strands 20, 21, 23 on the other hand, are processed by means of the control device 44 and related to each other and/or brought in connection with each other in order to control the fish supply system 10 with regard to a maximum and gapless filling of the speed conveyor 11.

The speed conveyor 11 as a transverse conveyor is a circumferentially driven endless conveyor and comprises troughs 45 for the individual reception of fish, wherein each trough 45 is configured and adapted for forwarding the fish 100 to a longitudinal conveyor 46 lying below the troughs 45, wherein the longitudinal conveyor 46 is configured and adapted for longitudinal axially conveying the fish 100, tail first. The troughs 45 are equipped with fish 100 in an upper run 47 of the speed conveyor 11. The troughs 45 return empty in a lower run 48. The longitudinal conveyors 46 are preferably placed between the upper run 47 and the lower run 48 in order to receive the fish 100 sliding out of the troughs 45. For releasing the fish 100 to the longitudinal conveyor 46 the troughs 45 have a moveable floor such that the floor or parts thereof can be controlled flap-like from a closed position into a release position and back again.

Figure 2:
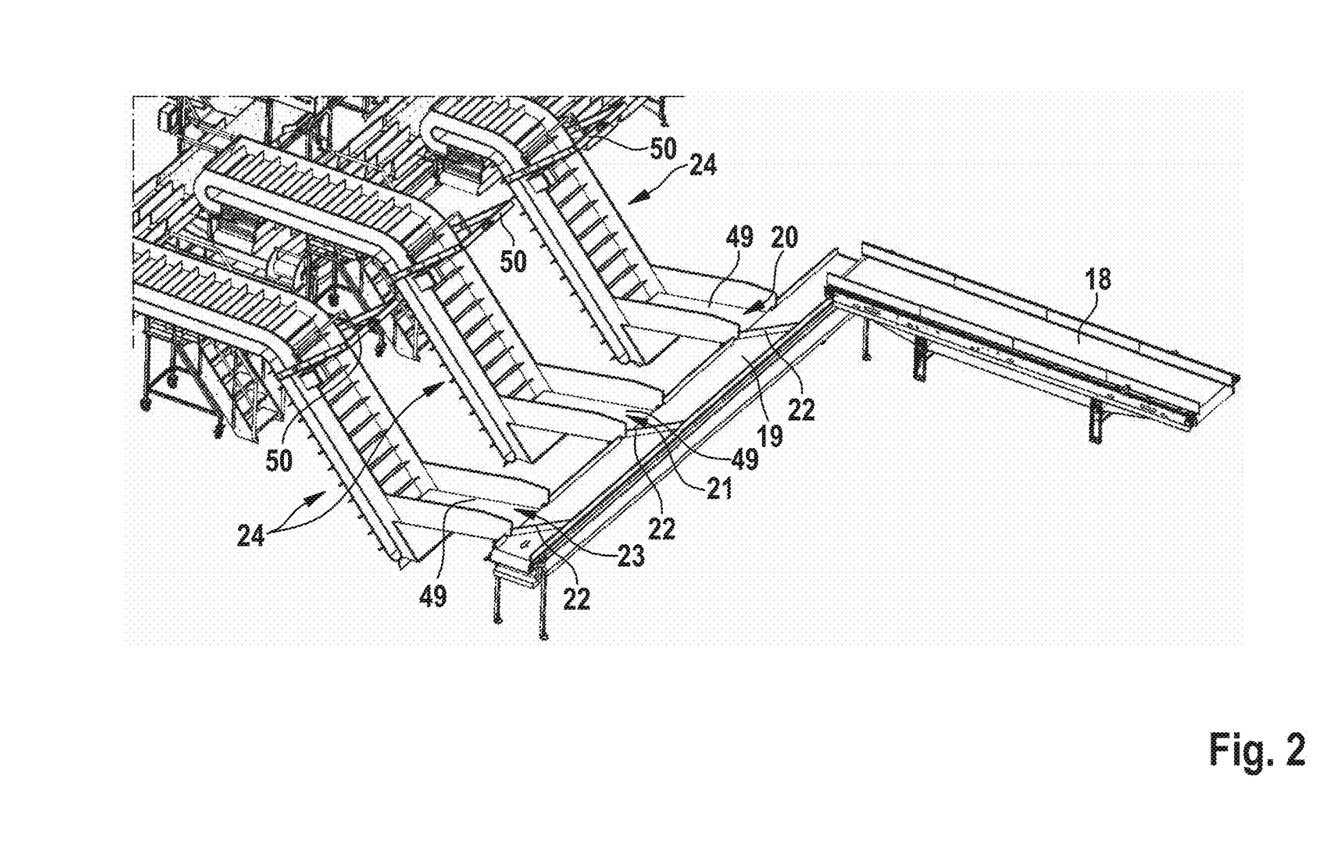
FIG. 2 shows a detailed view of the transition from the second conveyor belt to the ascending conveyor.

Scales (not explicitly illustrated) for determining the actual mass of the fish 100 to be conveyed are arranged before the ascending conveyor 24 between the second conveyor belt 19 and the ascending conveyor 24 of each conveyor strand 20, 21, 23 in the illustrated embodiment. The scales are preferably integrated into a slide 49, which ensures a sliding transfer of the fish 100 from the second conveyor belt 19 to the ascending conveyor 24. Each ascending conveyor 24 is configured as a circumferentially driven trough conveyor and a detection means for detecting the occupation of the troughs of the ascending conveyor is allocated to the ascending conveyor 24 of each conveyor strand 20, 21, 23. The detection means 50 can be a simple camera arranged above an upper run of the trough conveyor at a portal. The number of cameras or any other suitable detection means 50 as well as their positioning can of course vary. The or each detection means 50 is preferably connected with the control device 44 in order to be able to centrally collect and process the data and/or information of the detection means 50. The ascending conveyor 24 itself can also be in operative connection with the control device 44 in order to be able to control the ascending conveyor 24. The or each ascending conveyor 24 comprises not only the upwards running upper run for the separate conveying of the fish 100 lying in the troughs, but also a downwards running lower run for returning the empty troughs. At the upper end of the ascending conveyor 24 the same is configured and adapted to issue the fish 100 in the deflection region 51 from upper run to lower run.

Figure 3:
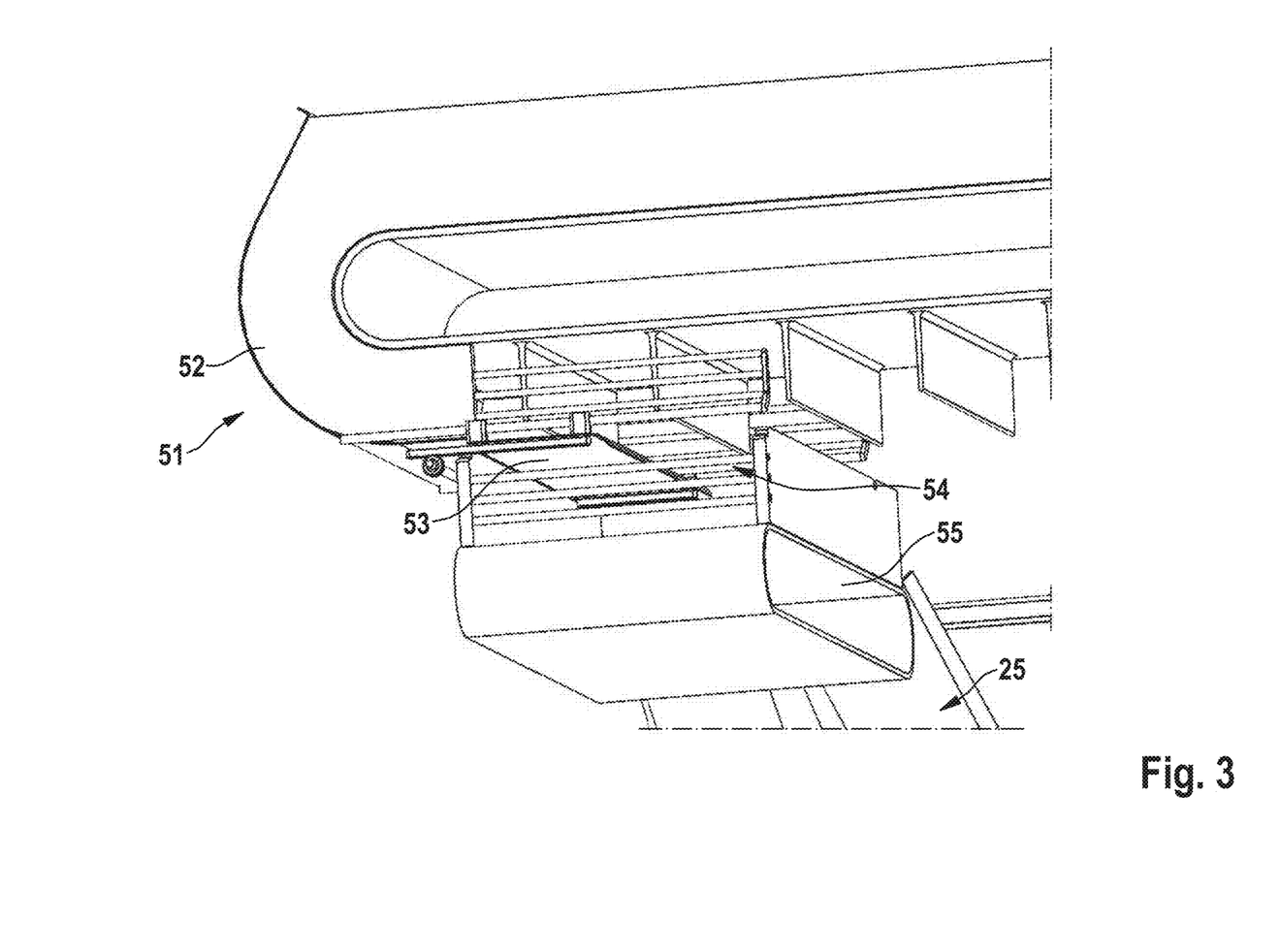
FIG. 3 shows a detailed view of the deflection region from upper run to lower run of an ascending conveyor.

Each ascending conveyor 24 is allocated a housing 52 in the deflection region 51 from upper run to lower run for this, which housing 52 is configured and adapted for guiding and holding the fish 100 in the troughs, wherein the housing 52 has at least one controlled flap 53 for the overhead release of the fish 100 from the ascending conveyor 24 on the side facing the upper run above the conveyor means downstream from the ascending conveyor 24. To put it simply the deflection region describes a U-turn so that a horizontally aligned output region 54 is formed in such a way that several troughs of the ascending conveyor 24 lie above the following conveyor means. An output of fish 100 that is staggered in the direction of width and/or length of the following conveyor means is thus guaranteed. The or each flap 53 is preferably connected with the control device 44 in order to be able to control the flap 53. The following conveyor means is a circumferentially driven belt conveyor 55 in the embodiment shown, by means of which the fish 100 can be conveyed to the slide 25. The slide 25 has several paths, gulleys or suchlike distributed across its width in such a way that the fish 100 can be conveyed in several tracks next to each other in the direction of the first belt conveyor 26. In the embodiment shown, the slide 25 is exemplarily followed by a belt conveyor 66 with guide plates 67 arranged in a fan shape, by means of which the fish 100 are guided onto the first belt conveyor 26, distributed across its width. Both belt conveyors 55, 56 are preferably connected with the control device 44 in order to be able to control the belt conveyors 55, 56.

Figure 4:
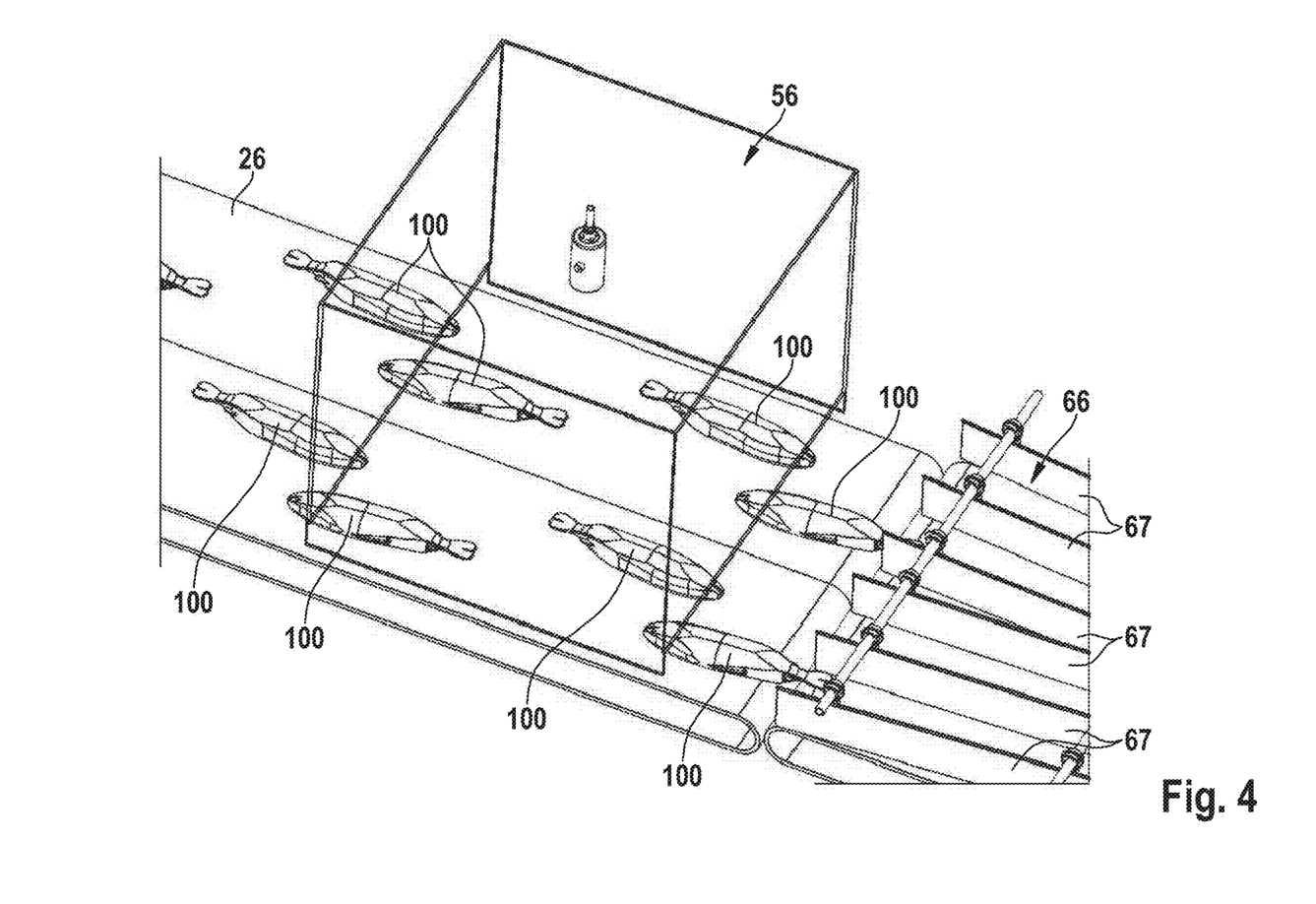
FIG. 4 shows a detailed view of a first belt conveyor with a detection means.

At least one detection means 56 for detecting the position of the fish 100 on the belt conveyor 26 and for detecting the orientation of the fish 100 on the belt conveyor are allocated to the first belt conveyor 26 of each conveyor strand 20, 21, 23. The detection means 56 can be a simple camera, which is arranged at a portal above the first belt conveyor 26. The number of cameras or any other suitable detection means 56 as well as their positioning can of course vary. The or each detection means 56 is preferably connected with the control device 44 much like the first belt conveyor 26 in order to be able to centrally collect and process the data and/or information of the detection means 50 and control the first belt conveyor 26.

The or each handling apparatuses 27, 37 allocated to the first belt conveyor 26 are configured and adapted for establishing an operative connection with the fish by being positioned on the same from above as well as for aligning and pulling the sliding fish 100 from the first belt conveyor 26 to the or each second belt conveyor 28, 38. Each handling apparatus 27, 37 has a linear guide 57, on which a displaceable cartridge 58 is arranged. The cartridge 58 is displaceable along the linear guide 57 transverse to the conveying direction of the first belt conveyor 26. The linear guide 57, or the cartridge 58, is additionally configured to also be moveable vertical to the first belt conveyor 26. A gripper head 59 is arranged on the cartridge 58 as a gripper means, which is rotatably mounted on the cartridge 58. In the embodiment shown the gripper head 59 comprises several, including four holding paddles, configured and adapted for abutting the fish 100 lying on one side. The or each holding apparatus 27, 37 is connected with the control device 44 in order to be able to control the handling apparatus 27, 37. The fish 100 can be pulled from the first belt conveyor 26 directly onto the second belt conveyor 28, 38 by means of the gripper head 59 and aligned head first in this way. In the specific embodiment the first belt conveyor 26 and the second belt conveyor 28, 38 are connected with each other by a slide 60. The defined head/tail alignment of the fish 100 therefore takes place in the transition region between the first belt conveyor 26 and the second belt conveyors 28, 38. Each second belt conveyor 28, 38 is preferably connected with the control device 44 in order to be able to control the second belt conveyor 28, 38.

Figure 7:
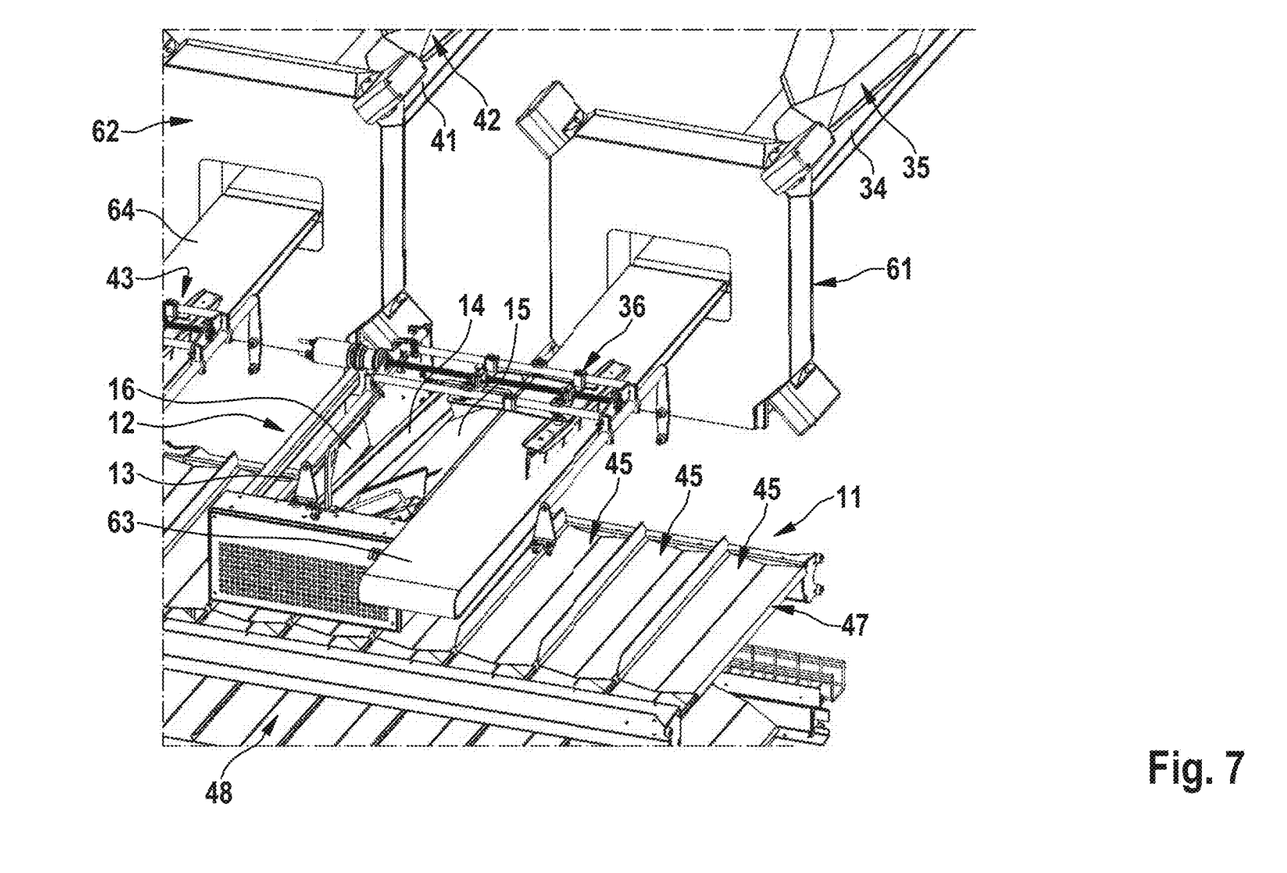
FIG. 7 shows a detailed view of the third belt conveyor with a detection device as well as a handling apparatus.

Apart from the turning station 35, 42 at least one detection device 61, 62 is allocated to the third belt conveyor 34, 41 behind the turning station 35, 42 and before the feeding apparatus 12, which detection device is configured and adapted for assessing different quality criteria. The detection device 61, 62 is configured as a camera station with four cameras. The number of cameras or any other suitable detection device 61, 62 as well as their positioning can of course vary. The or each detection device 61, 62 is connected with the control device 44 in order to be able to centrally collect and process the data and/or information of the detection device 61, 62. The third belt conveyor 34, 41 can be configured continuously up to the feeding apparatus 12. In the embodiment shown the third belt conveyor 34, 41 is divided in such a way that a fourth belt conveyor 63, 64 is arranged flush behind the third belt conveyor 34, 41 in conveying direction, wherein the detection device 61, 62 is arranged in the transition from the third belt conveyor 34, 41 to the fourth belt conveyor 63, 64 and the handling device 36, 43 for transverse axially conveying the fish 100 to the feeding apparatus 12 is arranged on the fourth belt conveyor 63, 64. The or each fourth belt conveyor 63, 64 is preferably connected with the control device 44 in order to be able to control the fourth belt conveyor 63, 64.

The fish supply system 10 can also be divided across more than three conveyor strands 20, 21, 23 and/or each conveyor strand 20, 21, 23 can be divided into more than two partial strands 20.1, 20.2; 21.1, 21.2; 23.1, 23.2.

The method will be explained in more detail with reference to the drawing in the following. The method serves for supplying fish 100, in particular of the salmon species, with defined head/tail alignment and defined prone/supine alignment to at least one fish processing apparatus 65 and is correspondingly suited. The method comprises the steps: aligning the fish 100 in the defined head/tail alignment and the defined prone/supine alignment, positioning the aligned fish 100 in a feeding apparatus 12 upstream of the speed conveyor 11 for transverse axially conveying the fish 100, wherein the fish 100 are conveyed from a receptacle 15 of a cascade conveyor 13 to the next receptacle 15 of the cascade conveyor 13 in the feeding apparatuses 12 until they lie in conveying direction in the last receptacle 15 at a clocking flap 16, by means of which the fish 100 are supplied to the speed conveyor 11 in a controlled way, and transverse axially conveying the fish 100 supplied to the speed conveyor 11 in the direction of the or each fish processing apparatus 65. The speed conveyor 11 preferably supplies four fish processing apparatuses 65.

This method is characterised according to the invention in that the fish 100 is conveyed by means of a supply device 17 from a device for bleeding the fish 100 to a feeding apparatus 12 of the speed conveyor 11, wherein the fish 100 are continuously automatically conveyed starting from the device for bleeding to the speed conveyor 11, and the regulated mass throughput of fish 100 is determined, and the fish 100 are conveyed in a speed regulated way and distributed onto several conveyor strands 20, 21, 23 in a controlled way, wherein the supply device 17 is controlled at the speed conveyor 11 depending on the capacity required.

The fish 100 are stunned and then killed. The fish 100 are counted during this. The counted fish 100 are then supplied to the device for bleeding, for example a spiral tank. The fish 100 are then guided directly onto a first conveyor belt 18, which is part of the supply device 17, from the spiral tank unsorted and as a batch. The fish 100 are then conveyed from the device for bleeding the fish 100 to one or more ascending conveyors 24 by means of the first conveyor belt 18 and the second conveyor belt 19. The mass throughput of the fish 100 is determined along or on the first conveyor belt 18. The conveying speed, in particular of the second conveyor belt 19, is regulated in order to distribute the required mass of fish 100 to individual conveyor strands 20, 21, 23. Control flaps 22 on the second conveyor belt 19 are controlled for this purpose.

The fish 100 are, initially individually separated along each conveyor strand 20, 21, 23, namely for example by means of the ascending conveyor 24, then untangled, namely for example by means of a slide 25, then aligned head first with regard to head/tail alignment, namely for example by means of a handling apparatus 27, 37, then aligned with regard to prone/supine alignment, namely for example by means of a turning station 35, 42, and subsequently supplied to the feeding apparatuses 12. The fish 100 are continuously supplied by several conveyor means for this, which guarantee continuous conveying from the second conveyor belt 19 to the feeding apparatuses 12. Starting with the second conveyor belt 19, in the embodiment shown the ascending conveyor 24, the slide 25, a first belt conveyor 26, a second belt conveyor 28, 38, a cascade conveyor 30, 40 and a third belt conveyor 34, 41 form a continuous conveying path,. Each conveyor strand 20, 21, 23 in fact divides into two partial strands 20.1, 20.2; 21.1, 21.2; 23.1, 23.2 behind the first conveyor belt 26. The actual mass of fish 100 along each conveyor strand 20, 21, 23 is determined, for example by means of scales, before the fish 100 are taken over by the ascending conveyor 24.

According to the arrangement of the conveyor means the fish 100 are conveyed first transverse axially, then longitudinal axially along each conveyor strand 20, 21, 23, then turned around an axis of rotation, which is aligned vertical to the longitudinal alignment of the fish 100 and vertical to the plane of transportation, then conveyed initially longitudinal axially again, then transverse axially, and then longitudinal axially again, before they are transverse axially conveyed into the feeding apparatus 12. Whilst conveying the fish 100 along the conveying path a first detection for detecting the occupation of each conveyor strand 20, 21, 23 takes place during the transverse conveying of the fish 100 in an ascending conveyor 24 along each conveyor strand 20, 21, 23. It is detected, for example with a camera, whether troughs of the ascending conveyor 24 are unoccupied or are occupied doubly or multiple times. This information is forwarded to the control device 44. A second detection for detecting the position of the fish 100 and the head/tail alignment is carried out on each conveyor strand 20, 21, 23 whilst further carrying the fish 100 along the conveying path along each conveyor strand 20, 21, 23 during the longitudinal conveying of the fish 100 on the first belt conveyor 26. The fish 100 lie on the first belt conveyor 26 with their longitudinal expansion in conveying direction at a distance from each other on several paths next to each other. The position of every fish 100 on the belt conveyor 26 is detected on the one hand, for example with a camera. On the other hand, its head/tail alignment is detected. This information is forwarded to the control device 44, which then controls the handling apparatuses 27, 37 accordingly in such a way that the fish 100 is moved head first onto the second belt conveyor 28, 38.

Figure 6:
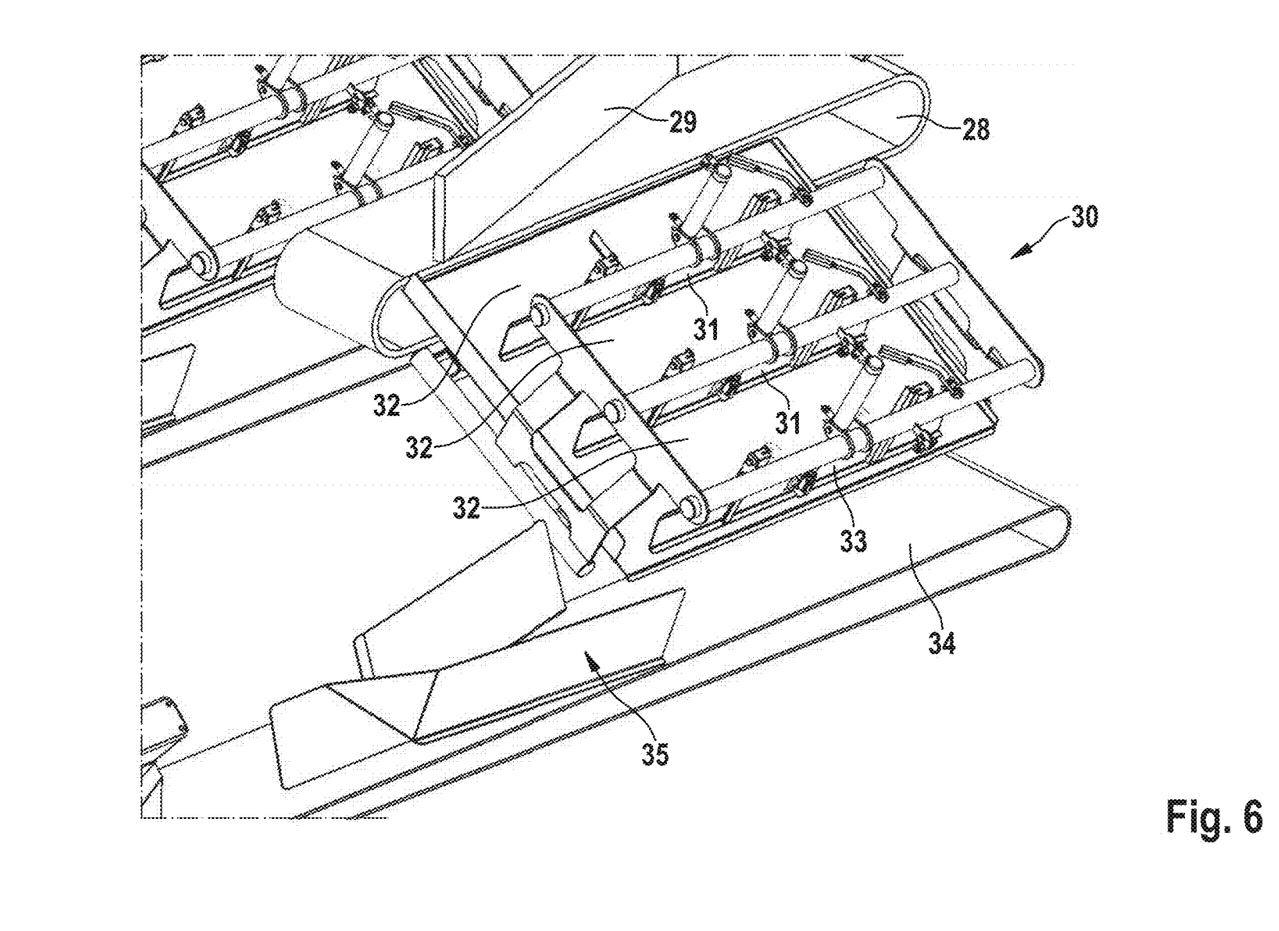
FIG. 6 shows a detailed view of the transition from the second belt conveyor to the third belt conveyor by means of a cascade conveyor.

Alignment in the correct and final head/tail alignment takes place when a force is applied from above to the fish 100 lying on the first belt conveyor 26 and the fish are then pulled from the first belt conveyor 26 onto a second belt conveyor 28, 38 by means of the handling apparatus 27, 37, wherein the fish 100 are then aligned head first. Following the head/tail alignment the fish 100 are conveyed to the clocking flap 33, receptacle 32 by receptacle 32, via the cascade conveyor 30, 40 and transferred to the second belt conveyor 28, 38 in a controlled way. The fish 100 are then also aligned with regard to the prone/supine alignment on the second belt conveyor 28, 38 following the head/tail alignment. For this the fish 100 are forced through the turning station 35, 42. Once they leave the turning station 35, 42 the fish 100 are conveyed through the third belt conveyor 34, 41 or from the third belt conveyor 34, 41 and a fourth belt conveyor 63, 64 to the feeding apparatuses 12. On the way to the latter the fish 100 pass a detection device 61, 62 for assessing different quality criteria during the longitudinal conveying of the fish 100. This information is forwarded to the control device 44, by means of which the handling apparatus 36, 43 is controlled in such a way that the fish 100, which preferably fulfil the quality criteria stored in the control device 44, are pulled off the third belt conveyor 34, 41 and conveyed into the receptacles 15 of the cascade conveyor 13 of the feeding apparatus 12, whilst fish 100 that do not comply with the quality criteria pass the handling device 36, 43 and are separated out.

The method is preferably carried out with a fish supply system 10 according to one or several of the claims 1 to 14.

The invention claimed is:

1. A fish supply system, configured and adapted for automatedly conveying fish with defined head/tail alignment and defined prone/supine alignment to a fish processing apparatus, comprising:
   a speed conveyor, which is configured and adapted for transverse axially conveying the fish with defined head/tail alignment and defined prone/supine alignment to the fish processing apparatus;
   at least two feeding apparatuses arranged above the speed conveyor, each feeding apparatus comprising;
     at least one cascade conveyor for transverse axially conveying the fish, each cascade conveyor having;
       at least two receptacles separated from each other by controllable flaps;
       at least one of the controllable flaps being a clocking flap for controlled output of fish to the speed conveyor in a conveying direction of a last of the at least two receptacles before said speed conveyor;
   a supply device operable to supply the fish from a bleeding device to the speed conveyor with the feeding apparatuses device, the supply device comprising;
     a first central conveyor belt for conveying the fish from the bleeding device in a direction of the speed conveyor, wherein flow scales for determining a regulated mass throughput of fish flowing from the bleeding device onto the first central conveyor belt are allocated to the first central conveyor belt;
     a second central conveyor belt following on from the first central conveyor belt for conveying the fish in the direction of the speed conveyor, wherein the second conveyor belt is configured and adapted to be speed regulatable;
     at least two conveyor strands, which each continuously connect the second conveyor belt with the feeding apparatuses of the speed conveyor for supplying the fish;
     a control flap allocated to the second conveyor belt for separating out the fish from the second conveyor belt to each of the at least two conveyor strands; and
     an electronic controller connected at least with, and operable to control in a technical way, the first conveyor belt and the flow scales, the second conveyor belt, the control flap, the conveyor strands, the speed conveyor and the feeding apparatuses, for supplying the speed conveyor with fish;

wherein each conveyor strand comprises:
- at least one ascending conveyor following on from the second conveyor belt for separating and transverse axially conveying the fish;
- a slide following on from the ascending conveyor for untangling the fish;
- a first belt conveyor following on from the slide for longitudinal axially conveying the fish;
- at least one handling apparatus arranged above the first belt conveyor, configured and adapted for receiving the fish from the first belt conveyor and releasing the fish, head first, to at least one second belt conveyor;
- the or each second belt conveyor following on from the or each first belt conveyor for longitudinal axially conveying the fish, head first;
- a deflector allocated to the or each second conveyor belt for deflecting the fish from the second belt conveyor to a cascade conveyor;
- the cascade conveyor following on from the or each second belt conveyor for transverse axially conveying the fish, the or each cascade conveyor having at least two receptacles separated from each other by controllable flaps, and a clocking flap at least in a last of the at least two receptacles in a conveying direction;
- a third belt conveyor following on from the or each cascade conveyor for longitudinal axially conveying the fish, head first, to a turning station allocated to the or each third belt conveyor for carrying out a correction of the prone/supine alignment; and
- a handling apparatus arranged above the or each third belt conveyor for transverse axially conveying the fish from the third belt conveyor to one of the at least two feeding apparatuses.

2. The fish supply system according to claim 1, wherein the electronic controller comprises a program component, configured and adapted for adjusting a capacity of the at least two conveyor strands to a capacity of the speed conveyor.

3. The fish supply system according to claim 1, wherein the speed conveyor is a circumferentially driven endless conveyor and comprises troughs for receiving individual fish, wherein each trough is configured and adapted for forwarding the fish to a longitudinal conveyor lying below the troughs, wherein the longitudinal conveyor is configured and adapted for longitudinal axially conveying the fish, tail first.

4. The fish supply system according to claim 1, further comprising scales for determining an actual mass of the fish to be conveyed, the scales arranged before the at least one ascending conveyor between the second conveyor belt and the ascending conveyor of each conveyor strand.

5. The fish supply system according to claim 1, wherein each ascending conveyor is configured and adapted as a circumferentially driven trough conveyor, the system further comprising a detection means allocated to the at least one ascending conveyor of each conveyor strand for detecting an occupation of the troughs of the ascending conveyor.

6. The fish supply system according to claim 5, wherein each ascending conveyor comprises an upwards running upper run for individually conveying the fish lying in the troughs and a downwards running lower run for returning the empty troughs, an upper end of each ascending conveyor in a deflection region of the upper run to the lower run is configured and adapted to release the fish.

7. The fish supply system according to claim 6, further comprising a housing allocated to each ascending conveyor in the deflection region from the upper run to the lower run, each housing configured and adapted for guiding and holding the fish in the troughs, wherein each housing has at least one controlled flap for overhead releasing the fish from the respective ascending conveyor on a side facing the lower run above a conveyor means downstream of the ascending conveyor.

8. The fish supply system according to claim 1, wherein the first belt conveyor of each conveyor strand is allocated at least one detection means for detecting a position of the fish on the first belt conveyor for detecting an orientation of the fish on the first belt conveyor.

9. The fish supply system according to claim 1, wherein the handling apparatus is configured and adapted placeable on the fish from above for producing an operative connection with the fish as well as for an aligning and a pulling sliding of the fish from the first belt conveyor onto the or each second belt conveyor.

10. The fish supply system according to claim 1, further comprising a slide connection the first belt conveyor and the or each second belt conveyor.

11. The fish supply system according to claim 1, further comprising at least one detection device allocated to the third belt conveyor in a conveying direction of the third belt conveyor behind the turning station and before the feeding apparatuses, the detection device being configured and adapted for assessing different quality criteria.

12. The fish supply system according to claim 11, further comprising a fourth belt conveyor arranged flush in the conveying direction behind the third belt conveyor, wherein the at least one detection device is arranged in a transition from the third belt conveyor to the fourth belt conveyor and the handling apparatus for transverse axially conveying the fish to the feeding apparatuses is allocated to the fourth belt conveyor.

13. The fish supply system according to claim 1, wherein the first conveyor belt is aligned at a substantially right angle to the second conveyor belt.

14. A method for supplying fish with defined head/tail alignment and defined prone/supine alignment to a fish processing apparatus, comprising the steps:
- aligning the fish in the defined head/tail alignment and the defined prone/supine alignment;
- positioning the aligned fish in feeding apparatuses upstream of a speed conveyor for transverse axially conveying the fish;
- wherein the fish are conveyed from a receptacle of a cascade conveyor to a next receptacle of the cascade conveyor in the feeding apparatuses until the fish lie in a conveying direction in a last of the receptacles at a clocking flap, and by the clocking flap the fish are supplied to the speed conveyor in a controlled way; and
- transverse axial conveying of the fish supplied to the speed conveyor in a direction of the fish processing apparatus;
- wherein;
  - the fish are conveyed by a supply device from a bleeding device to the feeding apparatuses of the speed conveyor;
  - the fish are continuously automatically conveyed starting from the bleeding device to the speed conveyor, and a regulated mass throughput of fish is determined;
  - the fish are conveyed in a speed regulated way and distributed onto several conveyor strands in a controlled way, wherein the supply device is controlled at the speed conveyor depending on a capacity; and the fish are conveyed by a first conveyor belt and a second conveyor belt from the bleeding device to at least one ascending conveyor, wherein the mass throughput of the fish is determined along the first conveyor belt and the second conveyor belt is regulated by an electronic controller with regard to a conveying speed of the second conveyor belt.

15. The method according to claim 14, wherein, along each conveyor strand, the fish are initially automatically separated then untangled, then aligned head first with regard to head/tail alignment, then aligned with regard to prone/supine alignment, and subsequently supplied to the feeding apparatuses.

16. The method according to claim 14, wherein, along each conveyor strand, the fish are initially transverse axially conveyed, then conveyed longitudinal axially, then turned around an axis of rotation that is aligned vertical to a longitudinal alignment of the fish and vertical to a plane of transportation, then initially longitudinal axially again, then transverse axially, and then longitudinal axially again, before the fist are transverse axially conveyed into the feeding apparatuses.

17. The method according to claim 14 wherein a first detection for detecting an occupation of a conveyor strand takes place along each conveyor strand during the transverse conveying of the fish in an ascending conveyor.

18. The method according to claim 14, wherein, along and each conveyor strand, a detection for detecting a position of the fish and the head/tail alignment on each conveyor strand takes place on during longitudinal conveying of the fish on a belt conveyor.

19. The method according to claim 14, wherein, along each conveyor strand, a detection for assessing different quality criteria takes place during longitudinal conveying of the fish on a belt conveyor.

20. The method according to claim 17, wherein an actual mass of the fish is determined along each conveyor strand before the fish are transferred to the ascending conveyor.

21. The method according to claim 14, wherein on a first belt conveyor, a force is applied to the fish from above for aligning the fish in the final head/tail alignment, and the fish is then pulled from a first belt conveyor onto a second belt conveyor, wherein the fish are aligned head first.

22. The method according to claim 21, wherein, following head/tail alignment, the fish are also finally aligned with regard to the prone/supine alignment.

23. The method according to claim 14, wherein the method is carried out with a fish supply system comprising:
a speed conveyor, which is configured and adapted for transverse axially conveying the fish with defined head/tail alignment and defined prone/supine alignment to the fish processing apparatus;
at least two feeding apparatuses arranged above the speed conveyor, each feeding apparatus comprising;
at least one cascade conveyor for transverse axially conveying the fish, each cascade conveyor having;
at least two receptacles separated from each other by controllable flaps;
at least one of the controllable flaps being a clocking flap for controlled output of fish to the speed conveyor in a conveying direction of a last of the at least two receptacles before said speed conveyor;
a supply device operable to supply the fish from a bleeding device to the speed conveyor with the feeding apparatuses device, the supply device comprising;
a first central conveyor belt for conveying the fish from the bleeding device in a direction of the speed conveyor, wherein flow scales for determining a regulated mass throughput of fish flowing from the bleeding device onto the first central conveyor belt are allocated to the first central conveyor belt;
a second central conveyor belt following on from the first central conveyor belt for conveying the fish in the direction of the speed conveyor, wherein the second conveyor belt is configured and adapted to be speed regulatable;
at least two conveyor strands, which each continuously connect the second conveyor belt with the feeding apparatuses of the speed conveyor for supplying the fish;
a control flap allocated to the second conveyor belt for separating out the fish from the second conveyor belt to each of the at least two conveyor strands; and
an electronic controller connected at least with, and operable to control in a technical way, the first conveyor belt the flow scales, the second conveyor belt, the control flaps, the conveyor strands, the speed conveyor and the feeding apparatuses, for supplying the speed conveyor with fish;
wherein each conveyor strand comprises:
at least one ascending conveyor following on from the second conveyor belt for separating and transverse axially conveying the fish;
a slide following on from the ascending conveyor for untangling the fish;
a first belt conveyor following on from the slide for longitudinal axially conveying the fish;
at least one handling apparatus arranged above the first belt conveyor, configured and adapted for receiving the fish from the first belt conveyor and releasing the fish, head first, to at least one second belt conveyor;
the or each second belt conveyor following on from the or each first belt conveyor for longitudinal axially conveying the fish, head first;
a deflector allocated to the or each second conveyor belt for deflecting the fish from the second belt conveyor to a cascade conveyor;
the cascade conveyor following on from the or each second belt conveyor for transverse axially conveying the fish, the or each cascade conveyor having at least two receptacles separated from each other by controllable flaps, and a clocking flap at least in a last of the at least two receptacles in a conveying direction;
a third belt conveyor following on from the or each cascade conveyor for longitudinal axially conveying the fish, head first, to a turning station allocated to the or each third belt conveyor for carrying out a correction of the prone/supine alignment; and
a handling apparatus arranged above the or each third belt conveyor for transverse axially conveying the fish from the third belt conveyor to one of the at least two feeding apparatuses.

* * * * *